United States Patent [19]

Iwabuchi et al.

[11] Patent Number: 4,464,518

[45] Date of Patent: Aug. 7, 1984

[54] PROCESS FOR THE POLYMERIZATION OR COPOLYMERIZATION OF ETHYLENE

[75] Inventors: Takeshi Iwabuchi; Hiroshi Morinaga; Masao Kawahara; Sakae Kamiyama; Terumi Sato; Muneto Yokota, all of Ichihara, Japan

[73] Assignee: Nissan Chemical Industries, Ltd., Tokyo, Japan

[21] Appl. No.: 385,314

[22] Filed: Jun. 4, 1982

[30] Foreign Application Priority Data

Jun. 24, 1981 [JP] Japan .................................. 56-98055
Apr. 23, 1982 [JP] Japan .................................. 57-67477

[51] Int. Cl.$^3$ .......................... C08F 4/02; C08F 10/02
[52] U.S. Cl. .................................... 526/127; 502/111; 502/116; 526/125; 526/128; 526/348.6; 526/352; 526/909
[58] Field of Search ................................ 526/127, 128

[56] References Cited

U.S. PATENT DOCUMENTS 3,907,759  9/1975  Okada et al. ......................... 526/128
4,223,118  9/1980  Tsubaki et al. ...................... 526/127

Primary Examiner—Edward J. Smith
Attorney, Agent, or Firm—Oblon, Fisher, Spivak, McClelland & Maier

[57] ABSTRACT

Polymerization of ethylene or copolymerization of ethylene with other α-olefin is carried out in the presence of a specific catalyst system. The catalyst system is obtained by preparing a reaction product (A) of an organic aluminum compound (I) represented by the formula $AlR_n^1X_{3-n}$ where $R^1$ is hydrogen or an alkyl group having from 1 to 10 carbon atoms, X is Cl or Br and n is a number satisfying $0<n<3$, with a mixture of a straight chain aliphatic alcohol and a branched chain aliphatic alcohol or a cyclic alcohol, separately preparing a reaction product (B) of an organic magnesium compound with a hydropolysiloxane or a silicone compound in which organic groups and hydroxyl groups are bonded to silicon atoms, reacting the reaction product (A) with the reaction product (B) to produce a reaction product (C), reacting the reaction product (C) with a halogen-containing titanium or vanadium compound to obtain a solid product (D) and mixing the solid product (D) with an organic aluminum compound (II).

19 Claims, No Drawings

PROCESS FOR THE POLYMERIZATION OR COPOLYMERIZATION OF ETHYLENE

BACKGROUND OF THE INVENTION

1. Field of the Invention

The present invention relates to a process for the polymerization or copolymerization of ethylene in the presence of a highly active novel catalyst, and particularly to a process for the production of a granular ethylene polymer having a large particle size. More particularly, the present invention relates to a process for producing an ethylene polymer having a uniform particle size and a high bulk density.

2. Description of the Prior Art

In recent years, there has been an increasing demand for so-called granular ethylene polymers i.e. ethylene polymers having a relatively large particle size, which can directly be molded by various molding machines without necessity of subjecting the ethylene polymer powder preliminarily to a granulating machine which requires a great deal of energy. Namely, granular ethylene polymers having good granularity and a narrow particle size distribution are suitable for use directly in a molding operation such as injection molding, extrusion molding or blow molding.

Further, it is desired to reduce the installation costs and the production costs by simplifying the process. For this purpose, it is necessary to improve the catalyst system to increase the catalytic activity per the transition metal or per the solid catalyst component, and when such a catalyst is used for a continuous slurry polymerization, it is necessary that the operation can be continued with high efficiency for a long period of time. In this respect, it is necessary to minimize the formation of fine polymer particles and to obtain a polymer having a uniform particle size and a high bulk density, whereby it is possible to increase the concentration of the slurry, to reduce the amount of the solvent required and thus to further reduce the installation and production costs.

The present inventors made extensive researches on catalysts useful for the polymerization, and invented processes in which a catalyst system is employed which comprises an organic metal compound and a solid catalyst component obtained by reacting a halogen-containing titanium or vanadium compound with a reaction product of a specific organic silicone compound with an organic magnesium compound, the solid catalyst being insoluble in an inert hydrocarbon solvent. Japanese patent applications were filed for the inventions and published under Japanese Patent Publication Nos. 19308/75, 19309/75, 154/76 and 12232/77. Further, the present inventors have proposed a process for producing an ethylene polymer having an improved molecular weight distribution, in which a solid catalyst component is employed which is obtainable by carrying out the above-mentioned reaction for the preparation of the solid catalyst component in the presence of an aluminum alkoxide compound or a reaction product of an aluminum alkoxide compound with water (Japanese Laid-Open Patent Application No. 47783/79).

However, the average particle size of the polymer obtainable by the above process is relatively small, and the process is not suitable to obtain a granular polymer having an average particle size of at least $300\mu$, preferably at least $500\mu$. Further, in the process, there is a certain room for improvement in the particle size distribution of the polymer. Particularly, it is desired to minimize fine particles which tend to cause troubles such as scattering during the transportation of the powder or which tend to reduce the efficiency of the granulating machine.

SUMMARY OF THE INVENTION

The present inventors have found that a catalyst prepared by selecting specific starting materials and employing specific manners for the preparation is extremely suitable for achieving the above-mentioned objectives, and have succeeded in accomplishing the present invention.

It is a primary object of the present invention to provide a process for preparing an ethylene polymer or copolymer having an average particle size of at least $300\mu$ and a high bulk density, whereby the particle size can optionally be adjusted.

Another object of the present invention is to provide a process which is capable of producing in good yield an ethylene polymer or copolymer having a narrower particle size distribution and a minimum content of fine particles.

The present invention provides an improved process for the polymerization or copolymerization of ethylene which comprises polymerizing ethylene or a mixture of ethylene and other $\alpha$-olefin in the presence of a catalyst system obtained by preparing a reaction product (A) of an organic aluminum compound (I) represented by the formula $AlR^1{}_nX_{3-n}$ where $R^1$ is hydrogen or an alkyl group having from 1 to 10 carbon atoms, X is Cl or Br and n is a number satisfying $0<n<3$, with a mixture of a straight chain aliphatic alcohol and a branched chain aliphatic alcohol or a cyclic alcohol, separately preparing a reaction product (B) of an organic magnesium compound with a hydropolysiloxane or a silicone compound in which organic groups and hydroxyl groups are bonded to silicon atoms, reacting the reaction product (A) with the reaction product (B) to produce a reaction product (C), reacting the reaction product (C) with a halogen-containing titanium or vanadium compound to obtain a solid product (D) and bringing the solid product (D) in contact with an organic aluminum compound (II).

The catalyst system of the present invention has, in addition to the above-mentioned characteristics, the following superior characteristics.

(1) The catalyst system has a high catalytic activity, whereby it is possible to attain a high productivity of the polymer even when a molecular weight controlling agent is used in a high concentration.

(2) The catalyst system is highly sensitive to a molecular weight controlling agent such as hydrogen, whereby it is possible to optionally adjust the molecular weight of the polymer within a wide range from a high molecular weight to a low molecular weight by using a molecular weight controlling agent.

(3) The production of wax can be minimized.

(4) The catalyst system is suitable for use in a so-called two step polymerization in which ethylene or an $\alpha$-olefin-containing ethylene is polymerized in two steps in the presence of different concentrations of hydrogen.

(5) The polymer obtained by the two step polymerization can be applied to an inflation film-forming method. The resulted film has minimum fish-eyes or gel and a high quality.

(6) The catalyst system gives good copolymerizability of ethylene with other $\alpha$-olefin, and is an extremely advantageous catalyst for the production of lower density polyethylene.

DETAILED DESCRIPTION OF THE PREFERRED EMBODIMENTS

The aluminum compound (I) used for the preparation of the catalyst system of the present invention is a compound represented by the general formula $AlR^1{}_nX_{3-n}$ where $R^1$ is hydrogen or an alkyl group having from 1 to 10 carbon atoms, X is Cl or Br and n is a number satisfying $0<n<3$.

Specific examples of the aluminum compound include dimethyl aluminum chloride, diethyl aluminum chloride, diisobutyl aluminum chloride, dihexyl aluminum chloride, dioctyl aluminum chloride, diethyl aluminum bromide, ethyl aluminum sesquichloride, n-octyl aluminum sesquichloride, ethyl aluminum dichloride, isobutyl aluminum dibromide and ethylhydride aluminum chloride, and mixtures thereof.

In the present invention, alcohols are used as a component of the catalyst system, and particularly it is required to use a mixture of a straight chain aliphatic alcohol and a branched chain aliphatic alcohol or a cyclic alcohol. If the straight chain aliphatic alcohol is used alone, a viscous solid substance is likely to be formed during the preparation of the catalyst and it tends to adhere to the reactor. Consequently, the particle size distribution of the polymer thereby obtained tends to be wide, and the particle size tends to be small. On the other hand, if a branched aliphatic alcohol or a cyclic alcohol is used alone, the catalytic activity tends to be low and the particle size tends to be small although no adhesion to the reactor occurs.

Whereas, it has been unexpectedly found that such drawbacks can almost completely be eliminated by the use of a mixture of a straight chain aliphatic alcohol and a branched chain aliphatic alcohol or a cyclic alcohol, and further it is thereby possible to substantially increase the particle size of the polymer and to improve the bulk density of the polymer.

Specific examples of the straight chain aliphatic alcohol include methanol, ethanol, n-propyl alcohol, n-butanol, n-hexanol, n-octanol, and cetyl alcohol.

As the branched chain aliphatic alcohol, there may be mentioned isopropanol, isobutanol, secondary butanol, tertiary butanol, 1-methylbutanol, neopentyl alcohol, 2-methylpentanol and 2-ethylhexanol.

As specific examples of the cyclic alcohol, there may be mentioned cyclobutanol, cyclohexanol, cycloheptanol, 2-methylcyclohexanol, 3-methylcyclohexanol, 4-methylcyclohexanol, cyclooctanol and cyclododecanol.

The molar ratio of the straight chain aliphatic alcohol to the branched chain aliphatic alcohol or the cyclic alcohol is usually within a range of from 10:1 to 1:10, preferably from 3:1 to 1:3.

The hydropolysiloxane used in the preparation of the reaction product (B) in the present invention is a silicone compound having a structural unit represented by the following general formula

  (I)

where $R^2$ is a monovalent organic group selected from the group consisting of an alkyl group, an aryl group, an aralkyl group, an alkoxy group and an aryloxy group, a is 0, 1 or 2, b is 1, 2 or 3 and $a+b \leq 3$. The silicone compound may be a compound having an optional degree of polymerization or a mixture of such compounds, and may be a grease or wax having various degrees of polymerization ranging from a low viscosity liquid having a low polymerization degree to the one having a viscosity of 100,000 centistokes at 25° C. or a solid. The terminal groups of the hydropolysiloxane do not substantially affect the catalytic activity and may be optional inert groups such as trialkyl silyl groups. Specific hydropolysiloxanes include tetramethyl disiloxane, diphenyl disiloxane, trimethylcyclotrisiloxane, tetramethylcyclotetrasiloxane, methylhydropolysiloxane, phenylhydropolysiloxane, ethoxyhydropolysiloxane, cyclooctylhydropolysiloxane, and chlorophenylhydropolysiloxane.

As other type of silicone compounds to be used in the preparation of the reaction product (B) in the present invention, there may be mentioned silane type compounds in which organic groups and hydroxyl groups are bonded to silicon atoms, as represented by the following general formula

  (II)

where $R^3$ is a monovalent hydrocarbon group having from 1 to 18 carbon atoms, n is a number of 1, 2 or 3, and when there are a plurality of $R^3$, they may be the same or different, or polysiloxane type compounds corresponding to condensation products of such silane type compounds. As $R^3$ in the formula (II), there may be mentioned an alkyl group, a cycloalkyl group, an aralkyl group, an aryl group and an alkaryl group, and they may be a straight chain type, a branched chain type, a saturated type, an unsaturated type or a cyclic type. As examples of silane type compounds represented by the above formula (II) where n is 3, there may be mentioned trimethylhydroxysilane, triethylhydroxysilane, triphenylhydroxysilane, methyldiphenylhydroxysilane, and benzylphenylhydroxysilane. As examples of the compounds where n is 2, there may be mentioned diethyldihydroxysilane, dipropyldihydroxysilane, diallyldihydroxysilane, dicyclohexyldihydroxysilane and diphenyldihydroxysilane. Further, the compounds where n is 1 include butyltrihydroxysilane, and phenyltrihydroxysilane.

As the polysiloxane type compounds corresponding to the condensation products of the compounds represented by the formula (II), there may be used those having a straight chain type, branched chain type or cross-linked polysiloxane compound having a siloxane bond of Si—O—Si. The degree of polymerization is not critical, and they may be a grease or wax ranging from the one having a low degree of polymerization having a viscosity of a few centistokes at 25° C. to the one having a viscosity of 1,000,000 centistokes, or they may be the ones in a solid state. Any such a polysiloxane type compound is useful so long as it contains at least one hydroxyl group per molecule as shown by the general formula (II). However, for a practical application, the number of hydroxyl groups should not be too small, and it is preferred that the content of hydroxyl groups in the polysiloxane type compound is at least 0.1 wt.%.

As specific examples of the polysiloxane type compound to be used in the present invention, there may be mentioned α,ω-dihydroxydimethylpolysiloxane represented by the formula $HO[Si(CH_3)_2O]_nH$ where n is an integer of at least 2, and α,ω-dihydroxymethylphenylpolysiloxane represented by the formula HO[-Si(CH$_3$)(C$_6$H$_5$)O]$_n$H where n is an integer of at least 2.

As the organic magnesium compound to be used for the reaction with the above specific organic silicone compound, various types of organic magnesium compounds may be used. Specific examples include compounds represented by the general formula

  (III)

where R$^4$ is a hydrocarbon group, X is a halogen atom, and p and q are a number of 0 to 1 to satisfy $p+q=1$, which are obtainable by the reaction of a halogen-containing organic compound and magnesium metal, and ether complexes and mixtures thereof. For instance, there may be mentioned a so-called Grignard reagent represented by the formula R$^4$MgX i.e. p is 0 and q is 1, a dihydrocarbyl magnesium represented by the formula R$_2^4$Mg, i.e. p is 1 and q is 0, and various other organic magnesium halides represented by the formula (MgR$_2^4$)$_p$.(R$^4$MgX)$_q$, and ether complexes thereof or mixtures thereof.

As specific examples of the compounds of the formula R$^4$MgX, there may be mentioned methyl magnesium chloride, ethyl magnesium chloride, ethyl magnesium bromide, n-propyl magnesium chloride, n-butyl magnesium chloride, tert-butyl magnesium chloride, n-octyl magnesium chloride and phenyl magnesium chloride.

As specific examples of the compounds of the formula R$_2^4$Mg, there may be mentioned diethyl magnesium, di-n-propyl magnesium, di-n-butyl magnesium, di-tert-butyl magnesium, di-n-octyl magnesium, and diphenyl magnesium.

These organic magnesium compounds can readily be prepared by a conventional method, for instance, in an ether solvent such as diethyl ether, dibutyl ether or tetrahydrofuran or in a hydrocarbon solvent such as heptane, octane, benzene or toluene in the presence of a proper amount of a complexing agent such as an ether or amine.

The reaction of the organic silicone compound with the organic magnesium compound is carried out, for instance, in the following manner.

Namely, the organic silicone compound is portionwise added to the organic magnesium compound synthesized in a proper solvent while stirring under an inert atmosphere. After the addition of the total amount, the stirring is continued for a predetermined period of time to complete the reaction. The organic magnesium compound may be used per se without diluting it, but in some cases, it is advantageous that the organic magnesium compound is diluted with a hydrocarbon solvent. This reaction can be conducted at a temperature of from $-50°$ to 100° C., but is is advantageous to carry out the reaction at a temperature higher than room temperature as the reaction can thereby be completed in 30 minutes to 5 hours.

As a solvent for the reaction, there may be used an inert hydrocarbon solvent i.e. an aliphatic or aromatic hydrocarbon compound. As specific examples, there may be mentioned hexane, heptane, cyclohexane, benzene, toluene, or xylene. Further, an ether solvent commonly used for the synthesis of the above-mentioned organic magnesium compound may also be used.

The ratio of the starting materials, i.e. the ratio of the organic silicone compound to the organic magnesium compound is preferably OH:MgR$^4$=1:0.05 to 1 in the case of an organic silicone compound having hydroxyl groups, as represented by the molar ratio of the hydroxyl groups contained in the organic silicone compound to the magnesium-hydrocarbon group bond (MgR$^4$), or is likewise preferably Si:MgR$^4$=1:0.05 to 1 in the case of a hydropolysiloxane. The ratio can optionally be selected from these ranges.

If the reaction product (B) thereby obtained and containing a great amount of an ether normally used as a solvent for the organic magnesium compound, is used as it is, the quality of the solid product (D) thereby obtained tends to be inferior. Therefore, volatile components such as the solvent are removed and the reaction product (B) is then redissolved in an inert hydrocarbon solvent afresh before use. However, it is usually preferred that after the reaction, an inert hydrocarbon solvent having a boiling point higher than that of the ether is added and the mixture is then subjected to distillation to remove the ether as much as possible.

The reaction to obtain the reaction product (A) from the organic aluminum compound (I) and the alcohol mixture, is usually carried out in an inert hydrocarbon solvent at an optional temperature within a range of from 0° to 150° C., preferably from 20° to 120° C. for a reaction time of from 0.5 to 10 hours. The alcohol mixture is used in an amount within a range of from 0.2 to 10 moles per mole of the organic aluminum compound (I).

The reaction conditions for the reaction of the reaction product (A) and the reaction product (B) to obtain the reaction product (C) are important since they give great influences over the particle size, the bulk density and the particle size distribution of the polymer. The reaction temperature is from 70° to 170° C., preferably from 100° to 150° C. and the reaction time is from 0.5 to 10 hours, preferably 1 to 5 hours. If the reaction temperature is higher than 170° C., decomposition takes place and no adequate particle size is obtainable. On the other hand, if the temperature is less than 60° C. and the reaction is insufficient, the particle size distribution tends to be wide and the particle size tends to be small, whereby a granular polymer is hardly obtainable.

The moles of the aluminum compound in the reaction product (A) to be reacted with one gram atom of magnesium in the reaction product (B) are from 0.2 to 20 moles, preferably from 0.5 to 5 moles. If the moles of the aluminum compound in the reaction product (A) are less than 0.2, no adequate particle size is obtainable. On the other hand, if they are more than 20 moles, the catalytic activity of the catalyst tends to be degraded, such being not practical.

The reaction product (C) thus obtained is then reacted with a halogen-containing titanium or vanadium compound to obtain a solid product (D).

The halogen-containing titanium compound may be represented by the general formula TiX$_n$(OR$^5$)$_{4-n}$ where X is a halogen atom, R$^5$ is a hydrocarbon group having from 1 to 8 carbon atoms and n is a number of from 1 to 4. As specific examples, there may be mentioned TiCl$_4$, TiBr$_4$, Ti(OC$_2$H$_5$)Cl$_3$, Ti(OC$_4$H$_9$)Cl$_3$, Ti(OC$_2$H$_5$)$_2$Cl$_2$, Ti(OC$_3$H$_7$)$_2$Cl$_2$, and Ti(OC$_4$H$_9$)$_2$Cl$_2$.

As the halogen-containing vanadium compound to be used for the preparation of the solid product (D) in the present invention, there may be mentioned, for instance, VCl$_4$, and VOCl$_3$.

In order to obtain a polymer having a uniform particle size and a high bulk density, it is necessary to carry out the reaction of the reaction product (C) with the halogen-containing titanium or vanadium compound under specific conditions. Namely, this reaction is carried out preferably in an inert hydrocarbon solvent, particularly an aromatic or halogenated aromatic solvent such as benzene, toluene or chlorobenzene. It is necessary to carry out the reaction at a temperature of from 0° to 150° C., preferably from 30° to 100° C. The amount of the halogen-containing titanium or vanadium compound is from 1 to 20 moles per gram atom of magnesium in the reaction product (B).

After the completion of the reaction, the solid component is usually separated and washed with an aliphatic hydrocarbon solvent such as hexane, heptane or kerosene to remove free halogen-containing transitional metal compounds and thereby to recover a solid product (D).

When the components present in the liquid phase of the above reaction mixture are insoluble in the aliphatic hydrocarbon solvent such as hexane, heptane or kerosene, they tend to cause an increase of the content of fine particles in the polyethylene. In such a case, it is preferred that the solid component is first washed with the same aromatic or halogenated aromatic solvent as used for the reaction, and then washed with the aliphatic hydrocarbon.

The content of the transitional metal in the solid product (D) obtained by such a method, can be suitably adjusted by controlling the reaction conditions between the reaction product (C) and the halogen-containing transitional metal compound, such as the temperature, time or the presence or absence of the solvent. In general, it is preferred that the transitional metal is present in an amount of from 1 to 120 mg per g of the solid product (D), and a catalyst comprising the solid product (D) having a transitional metal content within this range exhibits particularly superior performance.

The organic aluminum compound (II) constituting a second catalyst component of the present invention is an organic aluminum compound represented by the formula $AlR^6_n X_{3-n}$ where $R^6$ is a hydrocarbon group having from 1 to 8 carbon atoms, X is a halogen atom, a hydrogen atom or an alkoxy group, and n is a number from 1 to 3.

Specific examples of the organic aluminum compound (II) include trimethyl aluminum, triethyl aluminum, tributyl aluminum, diethyl aluminum chloride, dibutyl aluminum chloride, ethyl aluminum sesquichloride, diethyl aluminum hydride, dibutyl aluminum hydride and diethyl aluminum ethoxide.

The catalyst for polymerization of ethylene used in the present invention can readily be prepared by contacting the above solid product (D) with the above organic aluminum compound (II) in the presence or absence of an inert solvent, for instance, by charging both of them into a container for preparation of a catalyst or into a polymerization reactor and stirring them in the presence of a solvent. Their ratio is such that aluminum constitutes from 1 to 1000 gram atom per gram atom of titanium or vanadium in the catalyst.

The polymerization condition for the polymerization of ethylene or the copolymerization of ethylene with other α-olefin is usually the same as the condition used in the polymerization with use of a Ziegler catalyst. The polymerization can be conducted in either a liquid phase or a gaseous phase. It is further possible to carry out the polymerization in two steps under different reaction conditions. When the polymerization is carried out in a liquid phase, the catalyst of the present invention is dispersed in a suitable inert hydrocarbon solvent such as hexane, heptane or kerosene and ethylene is introduced thereto, whereby the polymerization can readily be carried out. The polymerization temperature is preferably from 30° to 200° C., especially from 60° to 100° C., and the polymerization pressure is preferably from the atmospheric pressure to 50 kg/cm². The amount of the catalyst is preferably such that the organic aluminum compound (II) is present in an amount of from 0.1 to 50 millimoles, especially from 0.3 to 10 millimoles, per 1 liter of the solvent.

The degree of polymerization of the polymer to be obtained by the process of the present invention can optionally be controlled by adjusting the polymerization temperature or the amount of the catalyst used. However, the most effective method for controlling the degree of polymerization is to add hydrogen to the polymerization system.

The polymerization catalyst used in the present invention is useful for the polymerization of ethylene and the copolymerization of ethylene with an α-olefin such as propylene, butene-1, hexene-1 or octene-1.

Now, the present invention will be described in further detail with reference to Examples.

Measurements employed in the Examples are as follows:

$MI_2$: Melt index (ASTM-D-1238-65T, 190° C., load: 2.16 kg)

Bulk density: Determined according to JIS K 6721-1966

Particle size distribution: with use of 11 different kinds of sieves ranging from 16 to 250 mesh, 50 g of polyethylene was shaked for 15 minutes by means of a Ro-Tap type shaking machine and thereby classified for the determination of the particle size distribution. The range of the particle size distribution was indicated by log σ where σ is a geometrical standard deviation in a logarithmic distribution probability formula, and the greater the value, the wider the particle size distribution. ("Dust Collecting Apparatus" New Edition (Nikkan-Kogyo Shimbun Co.) p. 15–80 (1963)).

EXAMPLE 1

(a) Preparation of a reaction product (B)

Into a glass reactor preliminarily thoroughly dried internally and flushed with nitrogen, 300 ml of a tetrahydrofuran solution of n-butyl magnesium chloride (which contained 0.670 mole of n-butyl magnesium chloride) was introduced, and while stirring the solution, 42.0 ml of methylhydropolysiloxane with its terminals sealed with trimethyl silyl groups (the viscosity: about 30 centistokes at 25° C.) (which contained 0.70 mole of Si) was dropwise added. To dissipate the heat generated, the reactor was cooled with a cooling medium. After the addition of the total amount, the reactor was further held at 70° C. for one hour, and then cooled to room temperature, whereupon a dark brown transparent solution was obtained.

To remove the excess tetrahydrofuran, this solution was diluted with 400 ml of toluene, and subjected to distillation under reduced pressure of from 160 to 170 mmHg to distill off 480 ml of a mixture of tetrahydrofuran and toluene. Then, 480 ml of toluene was further added, and in the same manner as above, 480 ml of a mixture of tetrahydrofuran and toluene was distilled off.

The solution thereby obtained was diluted with toluene to obtain 452 ml of a toluene solution having a Mg concentration of 1.48 moles/l.

(b) Preparation of a solid product (D)

Into a glass reactor equipped with a stirrer, a dropping funnel, a cooling condenser and a thermometer and preliminarily dried internally and flushed with nitrogen, 815 ml of toluene and 135.8 ml of diethyl aluminum chloride were introduced and heated to 50° C.

On the other hand, 153 ml of toluene, 142 ml of n-hexanol and 118 ml of cyclohexanol were introduced in the dropping funnel, and they were dropwise added in one hour. Under reflux, the reaction was conducted for one hour, whereupon a reaction product (A) was obtained. Then, 123 ml of toluene and 243 ml of the above reaction product (B) (which contains 0.36 gram atom of Mg) were added thereto, and under reflux, the reaction was conducted for 2 hours. The reaction product (C) thereby obtained was cooled to 50° C., and 198 ml of titanium tetrachloride was dropwise added in one hour. The mixture was heated to 75° C. and reacted for 2 hours. To the slurry thereby obtained, n-hexane was added, and the soluble components were separated by decantation and filtration. This washing operation was repeated six times, whereupon a solid product (D) was obtained. The Ti content in 1 g of this solid product was 28 mg.

(c) Polymerization of ethylene

Into a stainless steel autoclave having a capacity of 1.6 liter, equipped with a stirrer and a heating and cooling jacket and internally dried and flushed with nitrogen, 600 ml of n-hexane was charged and heated to 60° C., and then 0.5 m mole of triethyl aluminum and 4 mg of the solid product (D) obtained in the above step (b) were sequentially added. Then, hydrogen was introduced under 2.5 kg/cm$^2$ (absolute pressure), and after the temperature was raised to 75° C., the polymerization was carried out for one hour while continuously introducing ethylene to maintain the total pressure at 8 kg/cm$^2$ (gauge pressure). After cooling, the polymer was separated from the solvent and dried.

79 g of white powdery polyethylene was obtained, and the bulk density of this polyethylene was 0.350 g/cm$^3$, and MI$_2$ was 0.29.

The average particle size of this polyethylene was 630$\mu$ and log $\sigma$ was 0.11. The content of fine particles having a particle size of less than 100$\mu$ was 0.1 wt.%. Namely, the particles were granular and had a high bulk density, and the particle size distribution was extremely narrow.

The catalytic activity was 699 kgPE/g Ti·hr and 20 kgPE/g Cat·hr where kgPE/g Ti·hr represents the yield of polyethylene per gram of titanium per hour of the polymerization time, and kgPE/g Cat·hr represents the yield of polyethylene per gram of the solid product (D) per hour of the polymerization time.

EXAMPLE 2

(b) Preparation of a solid product (D)

A solid product (D) was obtained in the same manner as in Example 1(b) except that the solid catalyst slurry obtained after the reaction with TiCl$_4$ was washed three times with toluene and then four times with n-hexane. The titanium content in 1 g of this solid product (D) was 41 mg.

(c) Polymerization of ethylene

The polymerization was carried out under the same conditions as in Example 1(c), whereupon 107 g of polyethylene having MI$_2$ of 0.43 and a bulk density of 0.385 g/cm$^3$ was obtained. The average particle size of this polyethylene powder was 600$\mu$ and log $\sigma$ was 0.07.

The content of fine particles having a particle size of less than 100$\mu$ was 0%. Namely, the obtained polyethylene particles were granular and had a high bulk density, and the particle size distribution was extremely narrow. The catalytic activity was 652 kgPE/g Ti·hr and 27 kgPE/g Cat·hr.

COMPARATIVE EXAMPLE 1

(b) Preparation of a solid product

Into the same reactor as used in Example 1(b), 243 ml of the reaction product (B) obtained in Example 1(a) and 477 ml of toluene were charged and heated to 50° C., and 79 ml of TiCl$_4$ was dropwise added thereto in one hour. After the addition, the mixture was heated to 75° C. and reacted for 2 hours. The solid component thereby obtained was washed with n-hexane in the same manner as in Example 1(b), whereupon a solid product was obtained. The Ti content in 1 g of this solid product was 115 mg.

(c) Polymerization of ethylene

The polymerization was carried out under the same conditions as in Example 1(c), whereupon 172 g of polyethylene having MI$_2$ of 1.50 and a bulk density of 0.26 g/cm$^3$ was obtained.

The average particle size of this polyethylene powder was 132$\mu$ and log $\sigma$ was 1.85. The content of fine particles having a particle size of less than 100$\mu$ was 23 wt.%.

Namely, the average particle size was small and the particle size distribution was wide, and the product can hardly be regarded as granular polyethylene.

COMPARATIVE EXAMPLE 2

(b) Preparation of a solid product

A solid product was prepared in the same manner as in Example 1(b) except that as the alcohol component, 236 ml of only cyclohexanol was used. The Ti content in 1 g of the solid product thereby obtained was 75 mg.

(c) Polymerization of ethylene

Ethylene was polymerized under the same conditions as in Example 1(c), whereupon 24.3 g of polyethylene powder having MI$_2$ of 0.09, a bulk density of 0.212 g/cm$^3$, an average particle size of 290$\mu$ and log $\sigma$ of 0.1 was obtained.

The catalytic activity was 81 kgPE/g Ti·hr and 6 kgPE/g Cat·hr.

The particle size distribution of this polyethylene was narrow. However, the bulk density and the catalytic activity were extremely small, and the average particle size was small.

COMPARATIVE EXAMPLE 3

(b) Preparation of a solid product

A solid product was prepared in the same manner as in Example 1(b) except that as the alcohol component, 285 ml of only n-hexanol was used. After an addition of the reaction product (B), a viscous substance adhered to the inner wall of the reactor, and a part of the substance remained as adhered even upon completion of the preparation. The Ti content in 1 g of the solid catalyst component thereby obtained was 74 mg.

(c) Polymerization of ethylene

The polymerization was carried out under the same conditions as in Example 1(c), whereupon 182.3 g of polyethylene having MI$_2$ of 0.47 and a bulk density of 0.261 g/cm$^3$ was obtained. The average particle size of this polyethylene was 228$\mu$ and log $\sigma$ was 2.73. Thus, the particle size distribution was very wide, and the content of fine particles having a particle size of less than 100μ was at high as 8 wt%.

EXAMPLE 3

(b) Preparation of a solid product (D)

A solid product (D) was prepared in the same manner as in Example 1(b) except that as the alcohols, 66.2 ml of ethanol and 86.8 ml of isopropyl alcohol were used. The Ti content in 1 g of the solid product was 27.2 mg.

(c) Polymerization of ethylene

The polymerization was carried out under the same conditions as in Example 1(c), whereupon 105 g of white powdery polyethylene having $MI_2$ of 0.270 was obtained. The average particle size of this polyethylene was 745μ and log σ was 0.11. Thus, the polyethylene was granular and the particle size distribution was narrow. The bulk density was 0.300 g/cm$^3$.

The catalytic activity was 965 kgPE/g Ti·hr and 26.3 KgPE/g Cat·hr

EXAMPLE 4

(b) Preparation of a solid product (D)

Into the same reactor as used in Example 1, 450 ml of toluene and 126 ml of diethyl aluminum chloride were charged and heated to 50° C.

A mixed solution comprising 135 ml of toluene, 58.3 ml of ethanol and 76.6 ml of isopropyl alcohol was dropwise added thereto from the dropping funnel in one hour, whereby a reaction product (A) was obtained. Then, 162 ml of toluene and 0.5 mole of the above-mentioned (in Example 1) reaction product (B) were added to the reaction product (A), and the mixture was reacted for 2 hours under reflux, whereupon the reaction product (C) was obtained. After cooling the reaction mixture to 25° C., 275 ml of titanium tetrachloride was dropwise added in one hour. Then, the temperature was raised to 95° C. and the reaction was carried out for 2 hours. The slurry thereby obtained was washed with n-hexane in the same manner as in Example 1(b), whereupon a solid product (D) was obtained. The titanium content in 1 g of this solid product (D) was 42.9 mg.

(c) Polymerization of ethylene

The polymerization was carried out under the same conditions as in Example 1(c), whereupon 92 g of polyethylene having $MI_2$ of 0.35 and a bulk density of 0.350 g/cm$^3$ was obtained. The average particle size of this polyethylene was 405μ and log σ was 0.12.

COMPARATIVE EXAMPLE 4

(b) Preparation of a solid product

A solid catalyst component was prepared in the same manner as in Example 4(b) except that as the alcohol component, 153 ml of only isopropyl alcohol was used. The Ti content in the solid product thereby obtained was 52.5 mg/g.

(c) Polymerization of ethylene

The polymerization of ethylene was carried out under the same conditions as in Example 1(c), whereupon 42 g of polyethylene having $MI_2$ of 0.089 and a bulk density of 0.260 g/cm$^3$ was obtained. The average particle size of this polyethylene was 135μ and the shapes and the sizes of the particles were extremely irregular.

COMPARATIVE EXAMPLE 5

(b) Preparation of a solid product

A solid product was prepared in the same manner as in Example 4(b) except that as the alcohol component, 116.5 ml of only ethanol was used. The Ti content in the solid product thereby obtained was 39.7 mg/g.

(c) Polymerization of ethylene

The polymerization was carried out under the same conditions as in Example 1(c), whereupon 111 g of polyethylene having $MI_2$ of 0.22 and a bulk density of 0.242 g/cm$^3$ was obtained. The bulk density of this polyethylene was low and the average particle size was extremely small at a level of 103μ and the particle size distribution was extremely wide showing a two step distribution.

EXAMPLE 5

(a) Preparation of a reaction product (B)

Into a glass reactor preliminarily thoroughly dried internally, 54 ml of α,ω-dihydroxymethylpolysiloxane having an average polymerization degree of 9 (the SiOH content: 0.146 mole) and 100 ml of toluene were introduced, and 50 ml of a tetrahydrofuran solution of n-butyl magnesium chloride (which contained 0.146 mole of n-butyl magnesium chloride) was dropwise added thereto under stirring. During the dropwise addition, the reaction temperature was maintained at 50° C., and after the addition of the total amount, the reaction was continued at 70° C. for further one hour. To remove the excess tetrahydrofuran, this solution was diluted with 400 ml of toluene and subjected to distillation under reduced pressure of from 160 to 170 mmHg to distill off 480 ml of a mixture of tetrahydrofuran and toluene. Then, 480 ml of toluene was further added and in the same manner as above, 480 ml of a mixture of tetrahydrofuran and toluene was distilled off. The solution thereby obtained was diluted with toluene to obtain 580 ml of a toluene solution having a magnesium concentration of 0.25 mole/l.

(b) Preparation of a solid product (D)

Into a glass reactor equipped with a stirrer, a dropping funnel, a cooling condenser and a thermometer and preliminarily dried internally and flushed with nitrogen, 110 ml of toluene and 22.6 ml of diethyl aluminum monochloride were charged and heated to 50° C.

On the other hand, 30 ml of toluene, 22.6 ml of n-hexanol and 18.7 ml of cyclohexanol were introduced in the dropping funnel, and the mixture was dropwise added to the reactor in 30 minutes. The reaction was carried out under reflux for one hour, whereupon a reaction product (A) was obtained. Then, 240 ml of the above reaction product (B) was added thereto and the reaction was conducted under reflux for 2 hours. The reaction product (C) thereby obtained was cooled to 50° C., and 33 ml of titanium tetrachloride was dropwise added thereto in one hour. Then, the temperature was raised to 75° C., and the reaction was carried out for 2 hours. To the catalyst slurry thereby obtained, n-hexane was added, and soluble components were removed by decantation and filtration. This washing operation was repeated six times, whereupon solid product (D) was obtained. The Ti content in 1 g of this solid product (D) was 29 mg.

(c) Polymerization of ethylene

Ethylene was polymerized under the same conditions as in Example 1(c), whereupon 83 g of polyethylene having $MI_2$ of 0.40 and a bulk density of 0.363 g/cm$^3$ was obtained. The average particles size of this polyethylene powder was 560μ and log σ was 0.10. Namely, the obtained polyethylene was granular and had a high bulk density and the particle size distribution was extremely narrow. The catalytic activity was 716 kgPE/g Ti·hr and 21 kgPE/g Cat·hr.

EXAMPLES 6 TO 8

(b) Preparation of solid product (D)

Solid product (D) were prepared in a manner similar to Example 4(b) with use of different types of the organic aluminum compound (I) and different combination of the two alcohols. The preparation conditions and the results are shown in Table 1. The reaction product (B) used in Example 8 was prepared in the same manner as in Example 5 and was a reaction product of α,ω-dihydroxydimethylpolysiloxane with n-butyl magnesium chloride.

(c) Polymerization of ethylene

With use of each of the above solid product (D), ethylene was polymerized in the same manner as in Example 1(c). The yields and the physical properties of the polyethylene thereby obtained are shown in Table 1.

TABLE 1

| Examples | Example 6 | Example 7 | Example 8 |
|---|---|---|---|
| Conditions for the preparation of catalysts: | | | |
| Organic Al Compounds (I) | Al($C_2H_5$) 3/2 Cl 3/2 | Al($C_2H_5$)$_2$Cl | Al($C_2H_5$)$_2$Cl |
| Combinations of the alcohols ($R^1$ OH/$R^2$ OH)* | i-$C_3H_7$OH/ $C_2H_5$OH | i-$C_3H_7$OH/ n-$C_4H_9$OH | sec-$C_4H_9$OH/ $C_2H_5$OH |
| Total alcohols/Al Compound (Molar ratio) | 1.5 | 2.0 | 2.0 |
| Analytical results: | | | |
| Ti contents (mgTi/g cat) | 27.1 | 47.0 | 35.0 |
| Polymerization results: | | | |
| Yields (g) | 135 | 100 | 128 |
| MI$_2$ (g/10 min) | 0.35 | 0.25 | 0.28 |
| Bulk densities (g/cm) | 0.270 | 0.314 | 0.308 |
| Average particle sizes (μ) | 554 | 710 | 525 |
| Log σ (—) | 0.10 | 0.12 | 0.12 |

Note:
*$R^1$ OH/$R^2$ OH = 1 (molar ratio)

EXAMPLE 9

The operation was carried out in the same manner and under the same conditions as in Example 1(b) and (c) except that in the step for the preparation of the solid product (D), after the addition of 66.2 ml of ethanol and 86.8 ml of isopropyl alcohol, the reaction between products (A) and (B) was conducted at 150° C. The Ti content in 1 g of the solid product (D) thereby obtained was 36.0 mg. Likewise, the physical properties of the final product described in step (c) for the polymerization of ethylene became as follows:

The yield of white powdery polyethylene was 66.1 g, the bulk density was 0.351 g/cm³, MI$_2$ was 0.32, the average particle size was 840μ, and log σ was 0.07.

Further, experiments were conducted by varying the conditions and time of the reaction between products (A) and (B) to determine the optimum conditions. In Reference Example 1, the reaction was conducted at 190° C. for 2 hours and in Reference Example 2, the reaction was conducted at 60° C. for 0.5 hour. The results thereby obtained are shown in Table 2.

TABLE 2

| Examples | Example 9 | Ref. Exp. 1 | Ref. Exp. 2 |
|---|---|---|---|
| Conditions for the preparation of catalysts: | | | |
| Temp. (°C.) | 150 | 190 | 60 |
| Time (h) | 2 | 2 | 0.5 |
| Analytical results: | | | |
| Ti contents (mgTi/g cat) | 36.0 | 19.6 | 36.9 |
| Polymerization resuts: | | | |
| Yields (g) | 66.1 | 36.9 | 70.5 |
| MI$_2$ (g/10 min) | 0.32 | 0.34 | 0.30 |
| Bulk densities (g/cm³) | 0.351 | 0.242 | 0.267 |
| Average particle sizes (μ) | 840 | 212 | 247 |
| Log σ (—) | 0.07 | 0.11 | 0.34 |

EXAMPLE 10

(b) Preparation of a solid product (D)

A solid product (D) was prepared in the same manner and under the same conditions as in Example 1(b) except that instead of n-hexanol, 66 ml of ethanol was used, and the reaction between products (A) and (B) was carried out under pressure at 140° C. for 2 hours.

The Ti contents in 1 g of the solid product (D) thereby obtained was 30 mg.

(c) Polymerization of ethylene

Ethylene was polymerized under the same conditions as in Example 1(c), whereupon 64 g of polyethylene powder was obtained. The bulk density of this polyethylene was 0.402 g/cm³ and MI$_2$ was 0.25. The average particle size of this polyethylene was 820μ and log σ was 0.08.

EXAMPLE 11

(b) Preparation of a solid product (D)

A solid product (D) was prepared in the same manner and under the same conditions as in Example 1(b) except that instead of n-hexanol, 66 ml of ethanol was used and instead of cyclohexanol, 140 ml of 4-methylcyclohexanol was used.

The Ti content in 1 g of the solid product (D) thereby obtained was 38 mg.

(c) Polymerization of ethylene

Ethylene was polymerized under the same conditions as in Example 1(c), whereupon 84 g of polyethylene powder having MI$_2$ of 0.31 was obtained. The average particle size of this polyethylene powder was 620μ and log σ was 0.11 and the bulk density was 0.347 g/cm³.

EXAMPLE 12

(c) Copolymerization of ethylene with butene-1

The polymerization was carried out in the same manner as in Example 2(c) except that prior to the introduction of ethylene, 3 g of butene-1 was charged, and the amount of hydrogen supplied was 3.0 kg/cm², and the polymerization temperature was maintained at 85° C., whereupon 113 g of polyethylene having a density of 0.9516 g/cm³ was obtained. The bulk density of this polyethylene was 0.410 g/cm³ and MI$_2$ was 3.6. The average particle size of the polymer powder was 675μ and log σ was 0.11.

EXAMPLE 13

(c) Copolymerization of ethylene with butene-1

With use of 6 mg of the solid product (D) of Example 2(b) and 0.6 m mole of triethyl aluminum, the copolymerization of ethylene with butene-1 was carried out at a temperature of 60° C. under a total pressure of 5 kg/cm² (gauge pressure) by charging 30 g of butene-1 and 1 kg/cm³ of hydrogen prior to the introduction of ethylene. After the polymerization for one hour, 91 g of a polymer was obtained, which had MI₂ of 0.73 and a density of 0.9267 g/cm³. The average particle size of this polymer was 590μ and log σ was 0.12. The bulk density was 0.341 g/cm³.

We claim:

1. A process for the polymerization or copolymerization of ethylene which comprises polymerizing ethylene or a mixture of ethylene and other α-olefins in the presence of a catalyst system obtained by preparing a reaction product (A) of an organo aluminum compound (I) represented by the formula $AlR^1_nX_{3-n}$ where $R^1$ is hydrogen or an alkyl group having from 1 to 10 carbon atoms, X is Cl or Br and n is a number satisfying $0<n<3$, with a mixture of a straight chain aliphatic alcohol and a branched chain aliphatic alcohol or a cyclic alcohol, wherein the molar ratio of the straight chain aliphatic alcohol to the branched chain aliphatic alcohol or the cyclic alcohol is in the range of 10:1 to 1:10, separately preparing a reaction product (B) of an organo magnesium compound with a hydropolysiloxane or a silicone compound in which organic groups and hydroxyl groups are bonded to silicon atoms, reacting the reaction product (A) with the reaction product (B) at a temperature in the range of 70° to 170° C., to produce a reaction product (C), reacting the reaction product (C) with a halogen-containing titanium or vanadium compound to obtain a solid product (D) and bringing the solid product (D) in contact with an organo aluminum compound (II), thereby substantially increasing the particle size and bulk density of the formed polymer or copolymer, while minimizing the fine particle content thereof.

2. The process for the polymerization or copolymerization according to claim 1 wherein the organo aluminum compound (I) is a compound selected from the group consisting of a dialkylaluminum chloride, an alkylaluminum sesquichloride and an alkylaluminum dichloride.

3. The process for the polymerization or copolymerization according to claim 1 wherein the straight chain aliphatic alcohol is an alcohol selected from the group consisting of methanol, ethanol, n-propyl alcohol, n-butanol, n-hexanol, n-octanol and cetyl alcohol.

4. The process for the polymerization or copolymerization according to claim 1 wherein the branched chain aliphatic alcohol is an alcohol selected from the group consisting of isopropanol, isobutanol, secondary butanol, tertiary butanol, 1-methyl butanol, neopentyl alcohol, 2-methyl pentanol, and 2-ethyl hexanol.

5. The process for the polymerization or copolymerization according to claim 1 wherein the cyclic alcohol is an alcohol selected from the group consisting of cyclobutanol, cyclohexanol, cycloheptanol, 2-methyl cyclohexanol, 3-methyl cyclohexanol, 4-methyl cyclohexanol, cyclooctanol, and cyclododecanol.

6. The process for the polymerization or copolymerization according to claim 1 wherein the hydropolysiloxane is methyl hydropolysiloxane.

7. The process for the polymerization or copolymerization according to claim 1 wherein the silicone compound in which organic groups and hydroxyl groups are bonded to silicon atoms, is α,ω-dihydroxydimethylpolysiloxane.

8. The process for the polymerization or copolymerization according to claim 1 wherein the organo magnesium compound is a compound selected from the group consisting of compounds represented by the formulas $MgRX$ and $MgR_2$ where R is an alkyl group having from 1 to 12 carbon atoms and X is a halogen atom.

9. The process for the polymerization or copolymerization according to claim 1 wherein the halogen-containing titanium or vanadium compound is a compound selected from the group consisting of titanium tetrachloride, an alkoxy titanium trichloride, a dialkoxy titanium dichloride, vanadium tetrachloride and vanadium oxytrichloride.

10. The process for the polymerization or copolymerization according to claim 1 wherein the organo aluminum compound (II) is a compound selected from the group consisting of a trialkylaluminum, and a dialkylaluminum chloride.

11. The process for the polymerization or copolymerization according to claim 1, wherein the molar ratio of the straight chain aliphatic alcohol to the branched chain aliphatic alcohol or the cyclic alcohol is in the range of 3:1 to 1:3.

12. The process for the polymerization or copolymerization according to claim 1 wherein in the preparation of the reaction product (A), the molar ratio of the mixture of the straight chain aliphatic alcohol and the branched chain aliphatic alcohol or the cyclic alcohol to the organo aluminum compound (I) is within a range of from 0.2 to 10 per mole of the organic aluminum compound.

13. The process for the polymerization or copolymerization according to claim 1 wherein in the preparation of the reaction product (C), the reaction product (A) is reacted with the reaction product (B) in a proportion of from 0.2 to 20 moles per gram atom of magnesium in the reaction product (B).

14. The process for the polymerization or copolymerization according to claim 1 wherein in the preparation of the reaction product (C), the reaction is conducted at a temperature of from 70° to 170° C. for a reaction time of from 0.5 to 10 hours.

15. The process for the polymerization or copolymerization according to claim 1 wherein in the preparation of the reaction product (D), the halogen-containing titanium or vanadium compound is reacted with the reaction product (C) in a proportion of from 1 to 20 moles per gram atom of magnesium in the reaction product (C).

16. The process for the polymerization or copolymerization according to claim 1 wherein the α-olefin to be copolymerized with ethylene is selected from the group consisting of propylene, butene-1, hexene-1 and octene-1.

17. The process for the polymerization or copolymerization according to claim 13, wherein the reaction product (A) is reacted with the reaction product (B) in a proportion of from 0.5 to 5 moles per gram atom of magnesium in the reaction product (B).

18. The process for the polymerization or copolymerization according to claim 14, wherein in the preparation of the reaction product (C), the reaction is conducted at a temperature in the range of 100° to 150° C.

19. The process for the polymerization or copolymerization according to claim 14, wherein in the preparation of the reaction product (C), the reaction is conducted for a reaction time in the range of 1 to 5 hours.

* * * * *